(12) United States Patent
Burr et al.

(10) Patent No.: US 6,731,020 B2
(45) Date of Patent: May 4, 2004

(54) COLUMN ELECTRONICS CONTROL ASSEMBLY

(75) Inventors: Larry W. Burr, Saginaw, MI (US); Frederick J. Berg, Auburn, MI (US); Timothy M. Childs, Vassar, MI (US); Joel T. Cerva, Freland, MI (US); Stephen V. Gillman, Linwood, MI (US)

(73) Assignee: Delphi Technologies, Inc., Troy, MI (US)

( * ) Notice: Subject to any disclaimer, the term of this patent is extended or adjusted under 35 U.S.C. 154(b) by 176 days.

(21) Appl. No.: 09/794,854

(22) Filed: Feb. 27, 2001

(65) Prior Publication Data

US 2001/0028196 A1 Oct. 11, 2001

Related U.S. Application Data

(60) Provisional application No. 60/235,395, filed on Sep. 25, 2000, and provisional application No. 60/185,603, filed on Feb. 28, 2000.

(51) Int. Cl.⁷ ................................................ B60L 1/00
(52) U.S. Cl. .................... 307/10.1; 200/61.54; 343/711
(58) Field of Search ................................. 307/10.1, 115; 200/61.54, 61.27; 280/735; 439/15; 343/711, 841

(56) References Cited

U.S. PATENT DOCUMENTS

| | | | | |
|---|---|---|---|---|
| 4,616,224 A | * | 10/1986 | Reighard | ................... 307/10.1 |
| 4,715,031 A | * | 12/1987 | Crawford et al. | ........... 370/462 |
| 5,009,604 A | * | 4/1991 | Plocek et al. | ................. 439/15 |
| 5,198,696 A | | 3/1993 | Dennis | |
| 5,365,436 A | | 11/1994 | Schaller et al. | |
| 5,614,884 A | * | 3/1997 | Evans | ........................ 340/477 |
| 5,755,580 A | | 5/1998 | Chen | |
| 5,772,146 A | * | 6/1998 | Kawamoto et al. | .......... 242/388 |
| 5,787,367 A | * | 7/1998 | Berra | .............................. 701/1 |
| 5,790,065 A | | 8/1998 | Yaroch | |
| 5,856,710 A | | 1/1999 | Baughman et al. | |
| 5,877,726 A | * | 3/1999 | Kudoh et al. | ................ 342/175 |
| 5,944,534 A | | 8/1999 | Hoffmann et al. | |
| 6,020,563 A | * | 2/2000 | Risk et al. | ................ 200/61.54 |
| 6,025,776 A | * | 2/2000 | Matsuura | ..................... 340/438 |
| 6,078,293 A | * | 6/2000 | Yamamoto | ................... 343/713 |
| 6,088,639 A | * | 7/2000 | Fayyad et al. | ............... 180/271 |
| 6,095,836 A | | 8/2000 | Bolen et al. | |
| 6,099,038 A | * | 8/2000 | Jurik et al. | .................. 280/777 |
| 6,114,640 A | * | 9/2000 | Oddo et al. | ............... 200/61.27 |
| 6,121,692 A | | 9/2000 | Michaels et al. | |
| 6,169,339 B1 | | 1/2001 | Cripe | |
| 6,225,582 B1 | * | 5/2001 | Stadler et al. | ........... 200/61.27 |
| 6,264,513 B1 | * | 7/2001 | Marsh | ......................... 114/286 |

OTHER PUBLICATIONS

I–Car Adbantage, vol. VII, No. 3 May–Jun. 1994, pp. 1–6.*
Statutory Invention Registration No. US H1991H, Bolen et al. Pub: Sep. 4, 2001, Clockspring Using Flexible Printed Wiring.*

* cited by examiner

*Primary Examiner*—Brian Sircus
*Assistant Examiner*—Sharon A. Polk
(74) *Attorney, Agent, or Firm*—Michael D. Smith

(57) ABSTRACT

A device and method for a vehicle steering column subassembly having current electronic features (equipment) and integrating such electronic features and additional wireless communication circuits within a common node to reduce over crowding of the electronics within the body of the vehicle, and further integrating an antenna utilized for such wireless communication devices to enhance signal strength. The common node is modularly disposed around the steering column and preferably on top of the steering column proximate a steering handwheel to protrude from the instrument panel and above the vehicle sheet metal to reduce shielding.

31 Claims, 4 Drawing Sheets

COLUMN ELECTRONICS CONTROL ASSEMBLY

CROSS REFERENCE TO RELATED APPLICATIONS

This application claims the benefit of U.S. Provisional Application No. 60/185,603 filed on Feb. 28, 2000, entitled "Column Electronic Module (CEM) Package," which is incorporated herein by reference. This application further claims the benefit of U.S. Provisional Application No. 60/235,395 filed on Sep. 25, 2000, entitled "Antenna Integration Within The Column Electronics Module," which is incorporated herein by reference.

BACKGROUND

Modern vehicles are optionally equipped with more and more equipment for providing additional features and achieving more comfort. A majority of such equipment is proximate to or incorporated with a steering column assembly and is electrically activated. Typically, a 48-way column connector is utilized to connect the downlead wires associated with the steering column electronics to a steering column bulkhead. Furthermore, control circuits within a vehicle may incorporate various optional or standard equipment, such as a remote keyless entry system (RKE) that may also incorporate a burglar-proof device, a remote control starting device, a vehicle condition displaying system, a global positioning system (GPS), and a telephone remote control burglar-proof system, etc. Such equipment, however, is increasingly and typically provided as standard equipment. As a result, an increase in wiring cable and antennas is necessary for local and remote operation of the equipment, which makes it difficult to tidily manage and arrange the increased variety of sensor and control electronics within a limited amount of packaging room available to a vehicle.

BRIEF SUMMARY

An electrical system mounted high on a steering column subassembly for a vehicle comprising a column electronics control assembly having a plurality of interconnectable components plugged together. A method for integrating a vehicle wireless communication device is also disclosed comprising: modifying a steering column subassembly to include a circuit assembly modularly depending from a steering column subassembly and further including a communications interface for data exchange between the circuit assembly and vehicle systems, wherein the communications interface, and circuit assembly comprise a sense and control module; and positioning, adapting and configuring said sense and control module for modular communication with a plurality of interconnectable components.

BRIEF DESCRIPTION OF THE DRAWINGS

Referring now to the drawings wherein like elements are numbered alike in the several Figures.

DETAILED DESCRIPTION

Figure 1:
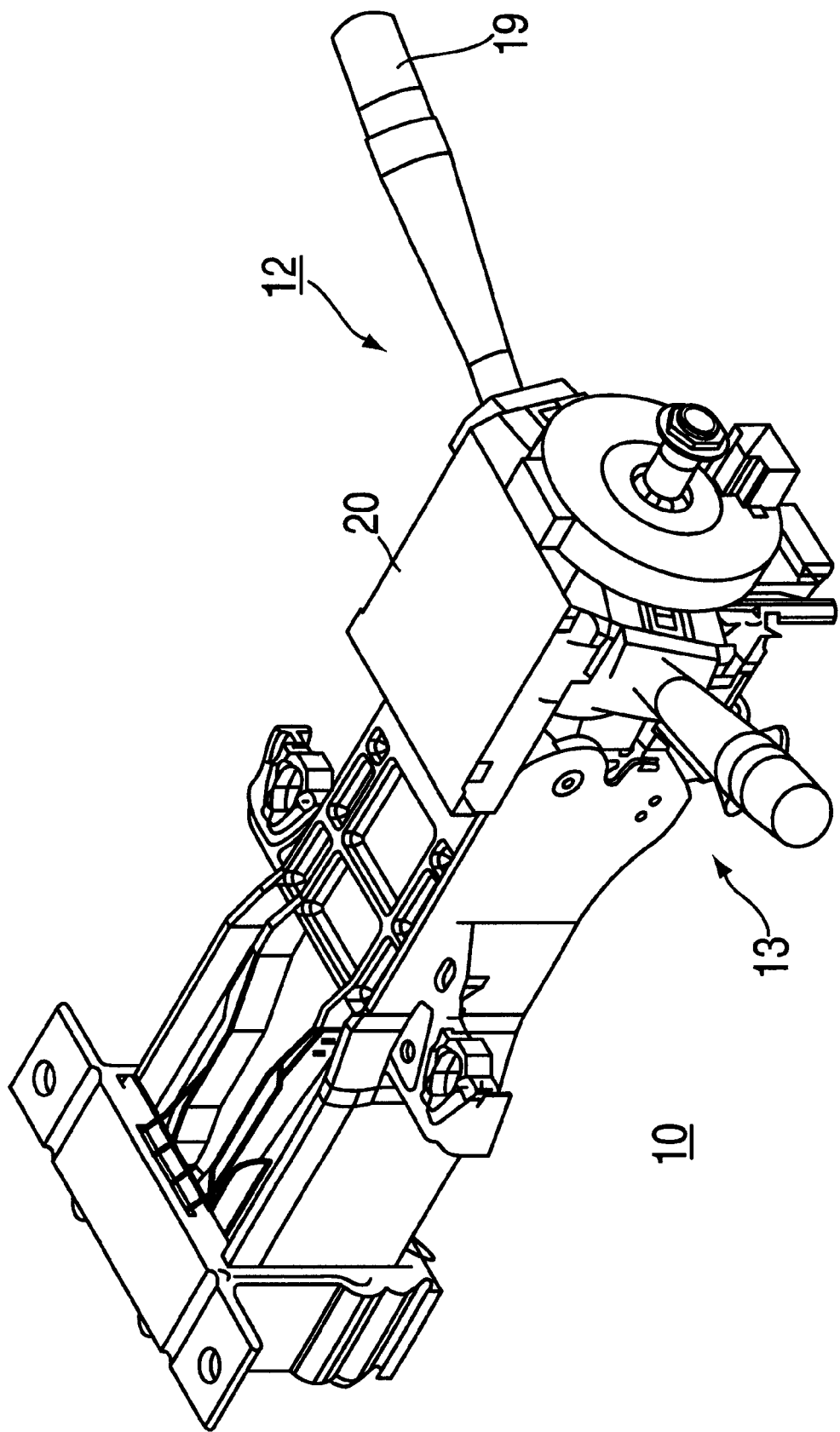
FIG. 1 is a perspective view of an existing steering column assembly, illustrating the location of a column electronics control assembly thereon.

Referring initially to FIG. 1, a column electronics control assembly 12 is shown disposed on an upper head 13 of a steering column subassembly 10. A column electronics control assembly comprises a plurality of interconnectable components having integral contacts that are plugged together, without any wiring harness or wire connection therebetween to make such an electrical connection. More specifically, an integral contact of each interconnectable component is a face-to face connection with a contact from another interconnectable component, such as in a pin and socket connection. Furthermore, the plurality of components is each plugged into a common node configured and for proximate engagement and modular communication with each of the interconnectable components discussed hereinafter.

Figure 2:
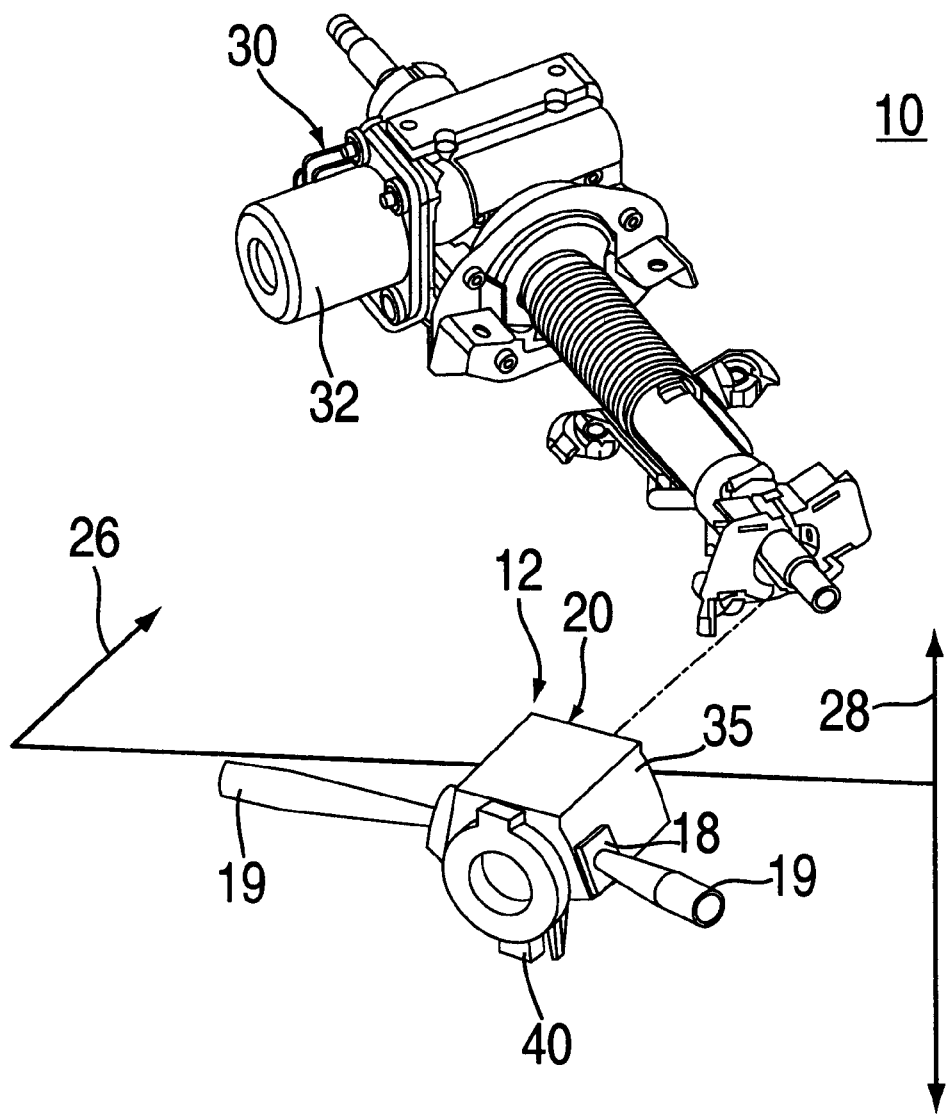
FIG. 2 is a perspective partially exploded view of a column electronics control assembly in conjunction with a column assist electric steering system.

Referring now to FIG. 2, the major elements of a column electronics control assembly 12, in an exemplary embodiment, as part of a steering column subassembly 10 are shown. It should be pointed out that although FIG. 2 depicts a steering system utilizing "column assist" electric power steering, the architecture of the present disclosure is applicable to other types of steering systems, including rack assist, front controlled steering, rear wheel electric steering (4WS system), steer-by-wire systems, and the like. A column electronics control assembly in one embodiment includes at least one multi-function stalk switch 18 and associated stalk switch control arm 19, airbag clockspring coil 38, optionally including an assembly line data link (ALDL) connector 40, an electronic control module referred to as a sense and control module 20, and a bracket 35 for modularly attaching all of the above to a steering column subassembly 10. The airbag clockspring coil 38 allows a steering wheel (not shown) to rotate while maintaining the electrical connection to an airbag module (not shown), as known in the art. The clockspring coil 38 optionally includes a sensor for determining the steering handwheel displacement and/or position. The ALDL connector 40 provides a connection node for a diagnostic computer to diagnose a vehicle electronics control system. ALDL connectors are disposed in various locations in a vehicle and a vehicle may have more than one ALDL connector. Incorporating an ALDL connector 40 with a column electronics control assembly in an upper head of a steering column subassembly 10 provides for uniform placement within a vehicle of such a connection node.

Referring to FIGS. 3A–3D, the column electronics control assembly 12 is preferably located high on an upper steering shaft housing 21. The components that comprise the column electronics control assembly 12 are modularly attached to bracket 35. At least one multifunction stalk switch 18 is releasably retained within the column electronics control assembly 12 in electrical communication with the sense and control module 20. The clockspring coil 38 is releasably connected and in electrical communication with the sense and control module 20. In an exemplary embodiment, referring to FIGS. 3C and 3D, two multifunction stalk switches have a tab 27 that is received and retained in a complementary opening 29 within the bracket 35 configured to releasably and securely contain the tab 27 of each multifunction stalk switch 18. The tab 27 is positioned, dimensioned and configured to enable snap-fitting assembly while providing releasable containment of the multifunction stalk switch 18. Such a configuration allows a reduction in size of the multifunction stalk switch 18 by about twenty percent because the absence of a conventional external locating retaining finger that aids in receiving and retaining a base of a conventional multifunction stalk switch is replaced with the tab 27 incorporated with a shorter length base section of a multifunction stalk switch 18. The tab 27 aids in locating as well as retaining the switch and allows for a shorter base section because a length of the base section is not used to initially guide the switch before locking, thereby allowing a shorter length base section when the tab 27 is disposed proximate a bottom portion of the base section. The clockspring coil 38 modularly attaches to a clockspring coil connector 41 that depends from a housing 23 that encloses the sense and control module 20. The clockspring coil connector 41 provides electrical communication between the clockspring coil 38 and the circuitry (not shown) contained in the sense and control module 20. The clockspring coil 38 also includes a module connector 43 for electrical communication with an air bag module and all driver control inputs incorporated with steering handwheel 42.

The modular electronic control module referred to as a sense and control module 20 is positioned, adapted and configured for modular communication with a plurality of interconnectable components. The sense and control module 20 comprises a circuit assembly modularly depending from the steering column and a communications interface for data exchange with other vehicle systems. The communications interface of sense and control module 20 includes two separate communications interfaces, namely a wiring downlead connector 22 and a supplemental inflatable restraint downlead connector 24 (FIG. 3D) for a first communications bus 26, and a second communications bus 28, respectively. Communications bus 26 is designed to provide communications relating to a supplemental inflatable restraint (SIR) system to the column bulkhead or to a SIR module (not shown). The second communications bus 28 provides interface and data exchange with systems such as the main electrical system, vehicle diagnostics, and multi-media systems. The downloads associated with second communications bus 28 include a power lead, a ground lead and a data bus.

Figure 3A:
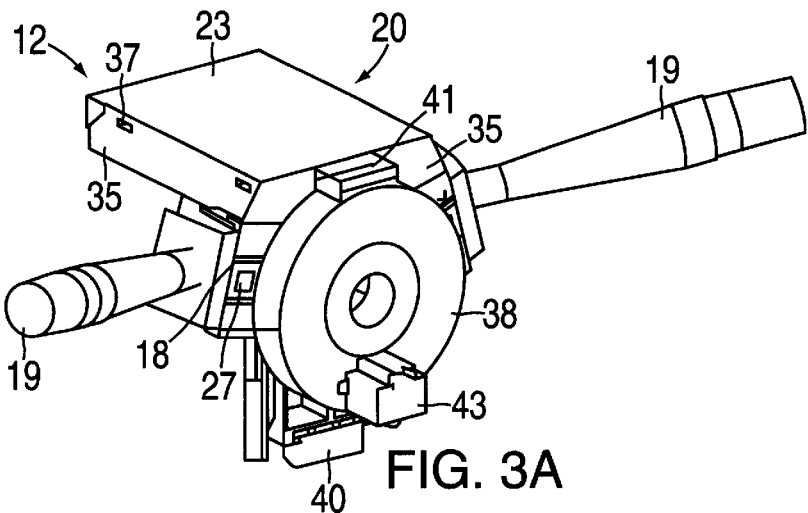
FIG. 3A is a perspective view of a column electronics control assembly with stalk switch controls, shown positioned on an upper steering shaft assembly.
Figure 3B:
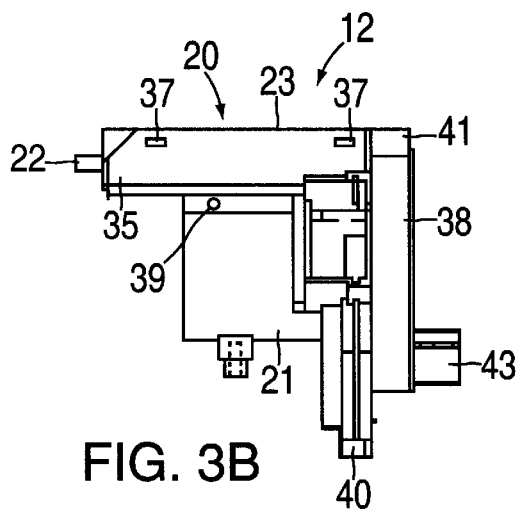
FIG. 3B is a side view of a column electronics control assembly, shown without the column stalk switches.
Figure 3C:
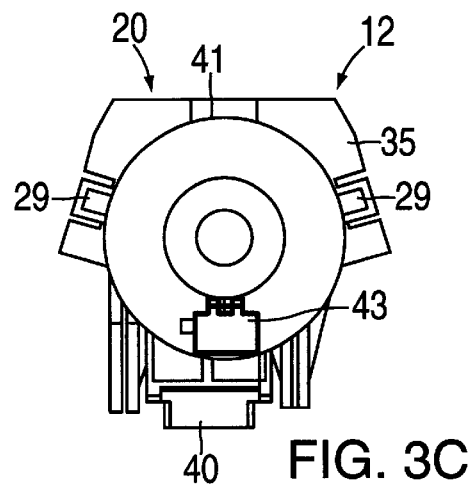
FIG. 3C is a front end view of the column electronics control assembly in FIG. 3B.
Figure 3D:
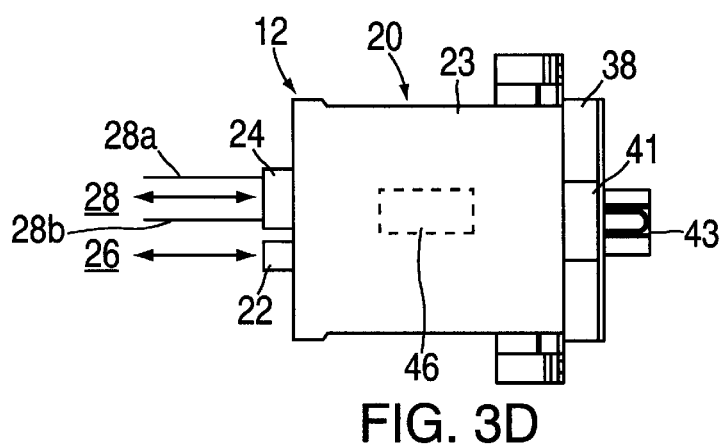
FIG. 3D is a top view of the column electronics control assembly in FIG. 3B.
Figure 4:
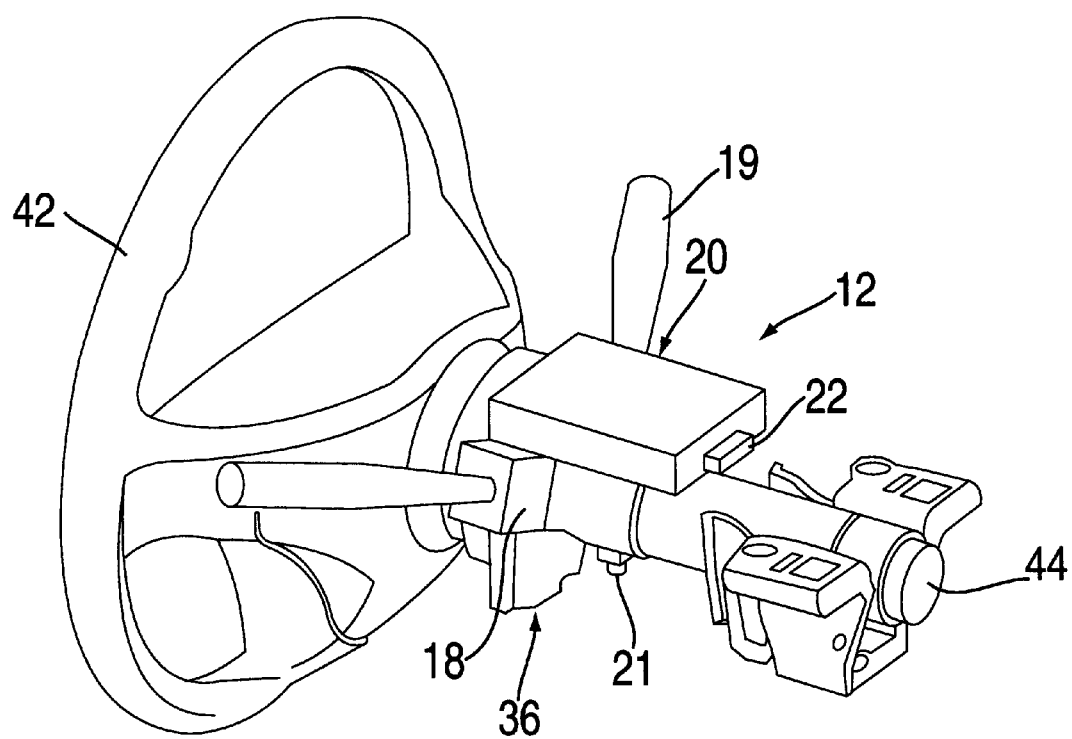
FIG. 4 is another perspective view of a column electronics control assembly for a steering system, shown positioned on an upper steering shaft assembly, steering shaft and steering wheel.

Referring to FIGS. 3A through 4, an exemplary embodiment of a column electronics control assembly 12 integrates vehicle steering column electronics into a common column node proximate the steering handwheel 42. Module 20 comprises a housing 23 attachable to a bracket 35 that is further attached to a steering column subassembly 36. The bracket 35 is attached to the steering column subassembly with a pin 39 that is received by the upper steering shaft housing 21 that houses the steering column shaft 44. The housing 23 snaps into the bracket 35 and is held in place with cutouts 37 on bracket 36 to engage protrusions (not shown) extending from housing 23. The snapped in module 20 aids in quick removal for servicing and diagnosing the module 20. The housing 23 has a replaceable internal circuit assembly (not shown) containing circuitry for controlling various vehicle functions. A hazard switch 46 for operably actuating exterior hazard indicator lights that indicate a potential hazardous condition is optionally included by disposing the switch 46 through the housing 23 (shown in phantom lines in FIG. 3D). The hazard switch extends through a shroud (not shown) that surrounds the steering column subassembly and extends far enough to enable mechanical operation of the switch. A circuit interconnection (not shown) provides electrical interconnection of the circuit assembly components and may be characterized by various technologies such as hand wiring, a printed card, flexible circuit, lead frame, ceramic substrate, or other circuit connection fabrication or methodology. An exemplary embodiment for the circuit assembly comprises the abovementioned elements interconnected with and affixed to a replaceable printed circuit board circuit.

Thus configured, column electronics control assembly 12 having module 20 reduces the number of wires and connectors that run within a steering column subassembly 36 to an external bulkhead. The reduction in wires and connectors is achieved by the internal processing of turn signal indicators, radio features, ignition interlock, and other signals generated by control inputs from a vehicle operator proximate the steering column. For example, typically 48 wires lead from a steering column to a steering column bulkhead connector. In utilizing a sense and control module 20, the wires required comprise a power lead wire 28a, a ground wire 28b and a data bus (i.e., second communications bus 28) plus the number of SIR downloads (i.e., communications bus 26) that are about 2–4 wires, dependant on the number of inflatable restraints. It will be appreciated that the power lead wire 28a and ground wire 28b are optionally included within either communications bus 26 or second communications bus 28.

By disposing the sense and control module 20 on top of a steering column, there is ample room for the module 20 to extend in length from a steering handwheel 42 along the steering column toward the front of the dashboard without altering or displacing other associated steering column components to package a longer module 20. For example, an exemplary embodiment of a module 20 is dimensioned and configured having a width of about three inches, a length of about five inches, and a height of one inch, thus dimensioned, ample room for additional customer features is available, and if needed, the housing may be extended in length to accommodate more. Furthermore, the one-inch height neither impacts nor obscures the display center of the vehicle. Moreover, configuring, positioning and dimensioning module 20 as aforementioned allows for maintaining a collapsible function of a steering column assembly. The module 20 provides a prime location for the functional integration of non-steering related systems such as the mobile multimedia interface, in addition to wireless communication devices such as, but not limited to, a vehicle control module, a safety system, a vehicle state information system, a remote start system, a remote lock and entry system, and/or a driver information/controls/entertainment system. This is accomplished by utilizing package space from the steering handwheel 42 and the column upper steering shaft 44, for processing vehicle and operator inputs; vehicle and operator control algorithm processing, and communication to other vehicle system control modules. The module 20 also has the capability to process algorithms from other sources, thereby decreasing the total number of algorithm processors/controllers in the vehicle.

According to the present electrical system there is also disclosed a method and an electrical system to further integrate an antenna in a sense and control module 20 and to further integrate wireless communication circuits that are increasingly offered as standard equipment therein. For example, remote keyless entry (RKE) systems are increasingly offered as standard equipment on vehicles. If a circuit and an antenna for such equipment is integrated in a sense and control module, preferably among other integrated wireless communication circuits, a steering column subassembly becomes more marketable. In addition, the present method and electrical system disclose an enhancement in such wireless communication signals by advantageously utilizing the relative orientation and position of a steering column subassembly in relation to the rest of a vehicle in which the subassembly is disposed.

Referring again to FIGS. 1 and 4, a method of the present invention is described. A method for increasing relative signal strength of a vehicle wireless communication device and may further optimize utilization of available space within a vehicle when installing the device, such as a remote keyless entry (RKE) system, comprising the processes of: modifying a steering column subassembly, and more specifically modifying a sense and control module therein to integrate wireless communication circuits that also process the respective signals; and integrating an antenna in the sense and control module for any wireless communication circuit. In an exemplary embodiment of the method, a method further comprises integrating a wireless communication circuit in the sense and control module 20, such as a global positioning system (GPS). These methods reduce the shielding effect caused by an instrument panel or vehicle sheet metal, and further eliminate connecting wires and connectors to and from a steering column bulkhead if the wireless communication circuit that utilizes the antenna is attached to the sense and control module 20 and thereby saves critical use of space. An alternative embodiment of this method utilizes the integrated antenna for a wireless communication circuit located outside the sense and control module 20 to reduce shielding.

In the process of modifying a sense and control module 20 to integrate wireless communication circuits, the sense and control module 20 includes a circuit assembly (not shown) containing circuitry to control other vehicle electric equipment that can be utilized to further integrate wireless communication circuits therein. The sense and control module 20 is large enough to integrate such devices as RKE or GPS within the sense and control module 20 while maintaining the integrity of a collapsible steering column. If necessary, however, the dimensions of the sense and control module may be altered such that the sense and control module may be elongated to fit topside and along a length of a steering column subassembly 10 without having to alter a shroud that typically encloses the subassembly 10, thereby increasing marketability and reducing costs of the subassembly.

In the process of integrating an antenna in the sense and control module 20, the antenna is utilized for any wireless communication circuit installed in a vehicle. By integrating an antenna in the sense and control module 20, a signal to or from the wireless communication circuit effectively increases because the orientation of the sense and control module 20 in a vehicle reduces shielding. More specifically, the antenna is above the surrounding vehicle sheet metal that makes up the vehicle body and is further removed from the instrument panel in this orientation. In an exemplary embodiment, the method includes having the wireless communication device associated with the at least one antenna also integrated in the sense and control module 20 to minimize wiring and connectors and to optimize available space within a vehicle.

A method of the present invention may further comprise disposing a sense and control module 20 with an integrated antenna on the topside of the steering column subassembly and further dispose the sense and control module 20 towards the driver, thus elevating the sense and control module 20 in this orientation. In this orientation, the sense and control module 20 optimizes any wireless communication signal by further reducing the shielding typically caused by the vehicle sheet metal and/or the proximity to the vehicle instrument panel.

The present method and electrical system reduce the cost and complexity of combining the equipment functions and control inputs from a vehicle operator in a single package, while reducing the size of the package. By further integration of an antenna for wireless remote control of any equipment function, such control signals are enhanced, while the number of additional components to implement this enhancement are minimized thereby reducing the cost of providing the remote control feature and reducing the packaging constraints within the vehicle.

Specifically, the present method and electrical system for an automotive vehicle provide integration within the sense and control module of any type of wireless communication by a vehicle control module, safety system, vehicle state information, remote start or entry feature, or driver information/controls/entertainment system, etc. and integration of any antenna for such wireless communication in the sense and control module.

For example, placing the RKE system within a sense and control module 20 reduces over crowding of the electronics within the body of a vehicle. A sense and control module 20 becomes more marketable as part of the steering column subassembly since RKE is becoming more popular with the customer. Furthermore, by placing a RKE circuit and an associated antenna within the sense and control module 20 that is preferably located on top of the steering column and proximate to the steering handwheel 42, wireless communication signals will be enhanced because of reduced shielding caused by the vehicle. More specifically, by placing any wireless communication circuit and its associated antenna within the sense and control module, the location of the sense and control module on the steering column enhances any signal transmitted or received by such circuit because the topside of the steering column proximate to the steering handwheel 42 is a natural place for an antenna since the steering column protrudes above the vehicle sheet metal and extends from the instrument panel. Moreover, the sense and control module 20 is disposed on top of an upper portion of a steering column that essentially further extends the antenna to further enhance any signal associated with a wireless communication circuit.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What claimed is:

1. An electrical system mounted high on a steering column subassembly for a vehicle comprising a column electronics control assembly having a plurality of interconnectable components plugged into a common node configured for operable communication therewith, said operable communication consists of each of said plurality of components having integral electrical contacts plugged into said common node, wherein said common node comprises:

a circuit assembly modularly depending from the steering column subassembly; and a communications interface for data exchange between said circuit assembly and vehicle systems.

2. The electrical system according to claim 1, wherein said common node is a modular sense and control module positioned, adapted and configured for proximate engagement and modular communication with said plurality of interconnectable components.

3. The electrical system of claim 1, wherein said control module is configured to extend along a length of the steering column without limiting a collapsible function of the steering column.

4. An electrical system substantially disposed on a steering column subassembly for a vehicle comprising a column electronics control assembly, said column electronics control assembly including:

a modular sense and control module positioned, adapted and configured for modular operable communication with a plurality of interconnectable components, said modular operable communication consists of electrical communication with said plurality of interconnectable components via integral electrical contacts therebetween, said modular sense and control module is configured for proximate engagement and modular communication with said plurality of interconnectable components, said sense and control module comprising a circuit assembly modularly depending from the steering column subassembly; and a communications interface for data exchange between said circuit assembly and vehicle systems.

5. The electrical system according to claim 4, wherein said plurality of interconnectable components includes at least one multifunction stalk switch adapted to be in electrical communication with said circuit assembly.

6. The electrical system according to claim 4, wherein said plurality of interconnectable components includes a clockspring coil adapted to be in electrical communication with said circuit assembly.

7. The electrical system according to claim 4, wherein said clockspring coil includes a sensor.

8. The electrical system according to claim 4, wherein said plurality of interconnectable components includes an ALDL connector adapted to be in electrical communication with said circuit assembly.

9. The electrical system according to claim 4, wherein said plurality of interconnectable components includes a hazard switch adapted to be in electrical communication with said circuit assembly.

10. The electrical system according to claim 4, wherein said sense and control module includes integration of at least one wireless communication circuit with said circuit assembly.

11. The electrical system according to claim 10, wherein said sense control module includes integration of an antenna.

12. The electrical system according to claim 4, wherein said sense and control module is disposed proximate a steering handwheel and topside of the steering column subassembly.

13. The electrical system of claim 4, wherein said control module is configured to extend along a length of the steering column without limiting a collapsible function of the steering column.

14. An electrical system substantially disposed on a steering column subassembly for a vehicle comprising:

a bracket attached to the steering column subassembly;

a housing modularly coupled to said bracket, said housing disposed on one side defining a periphery of the steering column subassembly; and a circuit assembly coupled to said housing; said circuit assembly further including a communications interface for data exchange with vehicle systems, said housing, communication interface, and circuit assembly comprise a sense and control module extending a length of the steering column assembly and surface mounted thereto, and wherein modularly depending from said bracket in operable communication with said sense and control module further includes at least one of:

at least one multifunction stalk switch;

a clockspring coil; and an ALDL connector, said operable communication consists of electrical connection therebetween.

15. The electrical system according to claim 14 wherein said at least one multifunction stalk switch is configured for releasable containment within said bracket and in electrical communication with said sense and control module.

16. The electrical system to claim 14 wherein said at least one multifunction stalk switch includes a tab that is received and retained in a complementary opening configured to releasably and securely contain said tab.

17. The electrical system according to claim 14 wherein said configuration of said at least one multifunction stalk switch allows about a twenty percent reduction in size of a multifunction stalk.

18. The electrical system according to claim 14 wherein said clockspring coil includes a sensor.

19. The electrical system according to claim 14 wherein sense and control module further includes a hazard switch operably depending therefrom.

20. The electrical system according to claim 14 wherein said sense and control module further includes an antenna for transmission and reception of signals for wireless communication devices.

21. The electrical system according to claim 14 wherein said communications interface comprises:

a wiring downlead connector; and a supplemental inflatable restraint downlead connector.

22. The electrical system claim 14, wherein said control module is configured to extend along a length of the steering column without limiting a collapsible function of the steering column.

23. An electrical system substantially disposed on a steering column subassembly for a vehicle comprising:

a bracket attached to the steering column subassembly;

a housing modularly coupled to said bracket, said housing disposed on one side defining a periphery of the steeling column subassembly;

a circuit assembly having a communications interface for data exchange coupled to said housing; and a wireless communication circuit, wherein said housing, said circuit assembly and said wireless communication circuit comprise a sense and control module configured for operable communication with a plurality of interconnectable components, wherein said operable communication consists of electrical communication therebetween.

24. The electrical system according to claim 23 wherein said sense and control module further comprises a hazard switch operably depending therefrom.

25. The electrical system according to claim 23 wherein said sense and control module further comprises:
    an antenna for said wireless communication circuit.

26. The electrical system of claim 25 wherein said sense and control module and said bracket are disposed on top of the steering column subassembly proximate a steering handwheel for optimizing signal strength to said antenna.

27. The electrical system of claim 25 wherein said sense and control module and said bracket are disposed on top of the steering column subassembly proximate a steering handwheel for optimizing signal strength to any wireless communication circuit and for case of service and replacement.

28. The electrical system according to claim 23 wherein said wireless communication circuit comprises at least one of:
    a vehicle control module;
    a safety system;
    a vehicle state information system;
    a remote start system;
    a remote lock and entry system; and
    a driver informational/driver controls/entertainment system.

29. The electrical system of claim 23, wherein said control module is configured to extend along a length or the steering column without limiting a collapsible function of the steering column.

30. A method for intergrating an automobile wireless communication device compromising:
    modifying a steering column subassembly to include a circuit assembly modularly depending from a steering column subassembly and further including a communications interface for data exchange between said circuit assembly and vehicle systems, wherein said communications interface, and circuit assembly comprise a sense and control module;
    positioning, adapting and configuring said sense and control module for operable communication with a plurality of interconnectable components, wherein said operable communication consists of electrical communication therebetween
    intergrating a wireless communication circuit for a wireless communication device is said sense and control module; and
    integrating an antenna in said sense and control module for said wireless communication device.

31. A method for increasing relative signal strength of an automobile wireless communication device comprising:
    integrating an antenna in an upper steering column assembly to receive and transmit signals for the wireless communication device;
    integrating a wireless communication circuit the upper steering column assembly, thereby eliminating connecting wires to arid from a steering column bulkhead;
    disposing said antenna and said wireless communication device within a sense and control module; and
    disposing said sense and control module on the topside of said steering column subassembly and further towards a steering handwheel to increase a relative signal strength when said sense and control module protrudes above the vehicle sheet metal and protrudes further from an instrument panel, thereby reducing any shielding caused by said sheet metal and said instrument panel, while maintaining a collapsible function of steering column.

* * * * *